F. ENGEL.
MACHINE FOR FORMING STORAGE BATTERY PLATES.
APPLICATION FILED MAR. 7, 1910.

1,190,991.

Patented July 11, 1916.
6 SHEETS—SHEET 1.

F. ENGEL.
MACHINE FOR FORMING STORAGE BATTERY PLATES.
APPLICATION FILED MAR. 7, 1910.

1,190,991.

Patented July 11, 1916.
6 SHEETS—SHEET 3.

F. ENGEL.
MACHINE FOR FORMING STORAGE BATTERY PLATES.
APPLICATION FILED MAR. 7, 1910.

1,190,991.

Patented July 11, 1916.
6 SHEETS—SHEET 4.

F. ENGEL.
MACHINE FOR FORMING STORAGE BATTERY PLATES.
APPLICATION FILED MAR. 7, 1910.

1,190,991.

Patented July 11, 1916
6 SHEETS—SHEET 5.

F. ENGEL.
MACHINE FOR FORMING STORAGE BATTERY PLATES.
APPLICATION FILED MAR. 7, 1910.

1,190,991.

Patented July 11, 1916.
6 SHEETS—SHEET 6.

Witnesses:

Inventor:
Frank Engel

UNITED STATES PATENT OFFICE.

FRANK ENGEL, OF BUFFALO, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

MACHINE FOR FORMING STORAGE-BATTERY PLATES.

1,190,991.       Specification of Letters Patent.    Patented July 11, 1916.

Application filed March 7, 1910. Serial No. 547,898.

*To all whom it may concern:*

Be it known that I, FRANK ENGEL, a citizen of the United States, residing at Buffalo, in the county of Erie and State of New York, have invented new and useful Improvements in Machines for Forming Storage-Battery Plates, of which the following is a full, clear, concise, and exact description, reference being had to the accompanying drawing, forming a part of this specification.

My invention relates to a machine for manufacturing storage battery plates.

The object of my invention is to produce a mechanism adapted to machine a plate which when completed, will have a plurality of fine, uniform, compact ribs covering substantially the entire surface of the plate and increasing its superficial area enormously.

In prior attempts to increase the superficial area of the plate, various methods have been adopted, all of which have serious disadvantages. One of the early methods was to cast a plate having fins or ribs thereon, but the density of the material in this case was not sufficient, nor was it uniform, and flaws occurred frequently throughout the plate. Another method was to spin the plates by forcing rapidly revolving disks or knives against the surface. This process tended to microscopically disrupt or tear the surface of the metal along the sides of the cut, thus subjecting the plate to the unequal attack of the electrolyte. Still another method was to plow or groove the plate, with somewhat the same disadvantages of tearing open the surface of the metal along the cut. Another method was to subject the plate to a rolling action which produced grooves and at the same time was intended to condense and render more compact the metal of the blank, particularly near the surface. One of the disadvantageous features of this rolling process, however, was that the upper layer or stratum of metal was pushed ahead or crowded along by the advancing roll, and being thus displaced with reference to the metal immediately under it, there was a tendency to disrupt the metal near the surface of the plate, rather than to condense it uniformly. Another disadvantage of the rolling process was the difficulty of forming very fine uniform grooves by a roll having thereon a plurality of projections or ribs, in some cases about twenty-five to an inch, which ribs, in rolling back and forth over the blank were lifted up at one point and then later were expected to fit into the same groove on the return stroke, to roll it deeper. Where such fine fins are used, it is very difficult to construct a machine having rolls which accurately match with the grooves upon repeated trips back and forth over the metal.

The present machine overcomes these disadvantages by forming a plate having very fine ribs which are in accurate alinement, and which are uniformly dense and compact over their entire surface. The way which I have adopted in practice, and which is very successful, is to work or embed groups or gangs of small blades in the surface of the metal blank, these gangs being applied to one or both sides of the blank and forced thereinto by pressure, while accompanied by a slight rocking motion to facilitate their insertion, to smooth, compress, and render compact all portions of the metal thereabout, and to permit the blades to be readily withdrawn from the blank when the work is finished.

While a machine for manufacturing a plate having the desired characteristics may be constructed in a variety of ways, I have selected for the purpose of illustration, a simple and practical embodiment of my invention as shown in the accompanying drawings, in which—

Fig. 14 shows a form of lead blank from which the plate is made, Fig.

15 shows a portion of one form of finished plate, Fig. 16 is a longitudinal section thereof on line B—B. Fig. 17 is a transverse section on line C—C, Fig. 15, Fig. 18 is a transverse section of a modified form of plate, having no center web, Fig. 19 is a longitudinal section thereof, Fig. 20 is a partial section on line D—D, Fig. 4, Fig. 21 is a section on line E—E, Fig. 20.

The machine selected for illustration, comprises a base 1, supporting shaft 2, at one end, driven by pulley 3, through reduction gears 4 and 5. It is understood, of course, that any suitable form of drive may be used. The base also carries four upright members 6, having bearing caps 7, adjustable with respect thereto by means of screws 8, at one end thereof, the other end being secured by any suitable means such as pin 9.

A frame or blank holder 10, is slidably supported about the middle of the uprights 6 and is adapted to carry a lead blank 11 from which the finished plate is to be made. This frame slides in ways formed by lugs 12, and accordingly may be readily withdrawn from the machine. Of course it may be supported by other suitable means. The blank is held snugly in the frame and supported by a lip 13, or it may be secured by any suitable clamping means.

The essential parts of the machine which coöperate with the blank to form it in the manner described above, are a series of gangs of small blades whose working edges, when applied to the plate, cover substantially the entire area of a side, a mounting or support for all the blades on one side of the blank and to which the blades are pivoted in rows or gangs, means for advancing the mounting toward the blank either continuously or intermittently, to embed the blades in the blank, and mechanism for imparting a slight reciprocation to the mounting to rock all the blades during their advance, as described more in detail later.

Inasmuch as two sets of blades or formers are illustrated, one above and one below the plate, which sets are substantially alike, it will be necessary to describe only the upper one, except where it differs in some slight detail from the lower. It is not essential that the blank be held horizontally, as it might be arranged in any convenient position as long as the two sets of formers are mounted so as to simultaneously operate upon its opposite sides. If it is desired to work only one side of a plate, one set of formers may be omitted and a substantial support or backing for the blank substituted therefor. Owing to the rocking action and to the fact that a large number of closely alined formers act on the plate simultaneously, it becomes practical to work one side only if desired, without the plate adhering to the sides of the embedded oscillating formers sufficiently to result in a bending or distortion of the blank such as would be likely to occur if the attempt were made to roll a ribbed, cylindrical former across one side of the plate.

Referring now to the upper half of the machine, the adjustable bearing caps 7 constitute journals for an eccentric shaft 14, on which is mounted an eccentric cap 15, to which is secured a plate or cross-head 16. The cap 15 may however be advanced by a step by step movement if desired, instead of by a gradual eccentric motion, or any other suitable continuous or intermittent movement may be imparted. The cross-head, as seen particularly in Fig. 8, has at each of the four corners, a depending apron 17, adapted to slide upon one of the four parallel upright members 6. Instead of this arrangement, it will be obvious that any suitable group of parallel ways may be provided, which will answer the purpose. The cross-head has beveled portions 18, which constitute a dove-tailed connection adapted to engage a corresponding dove-tail on a slide 19. This slide 19 is adapted to reciprocate with respect to the plate or cross-head 16 and eccentric cap 15, and at the same time to be carried toward or away from the blank by the slight rotary movement of the cap 15 upon the eccentric shaft 14.

Figure 2:
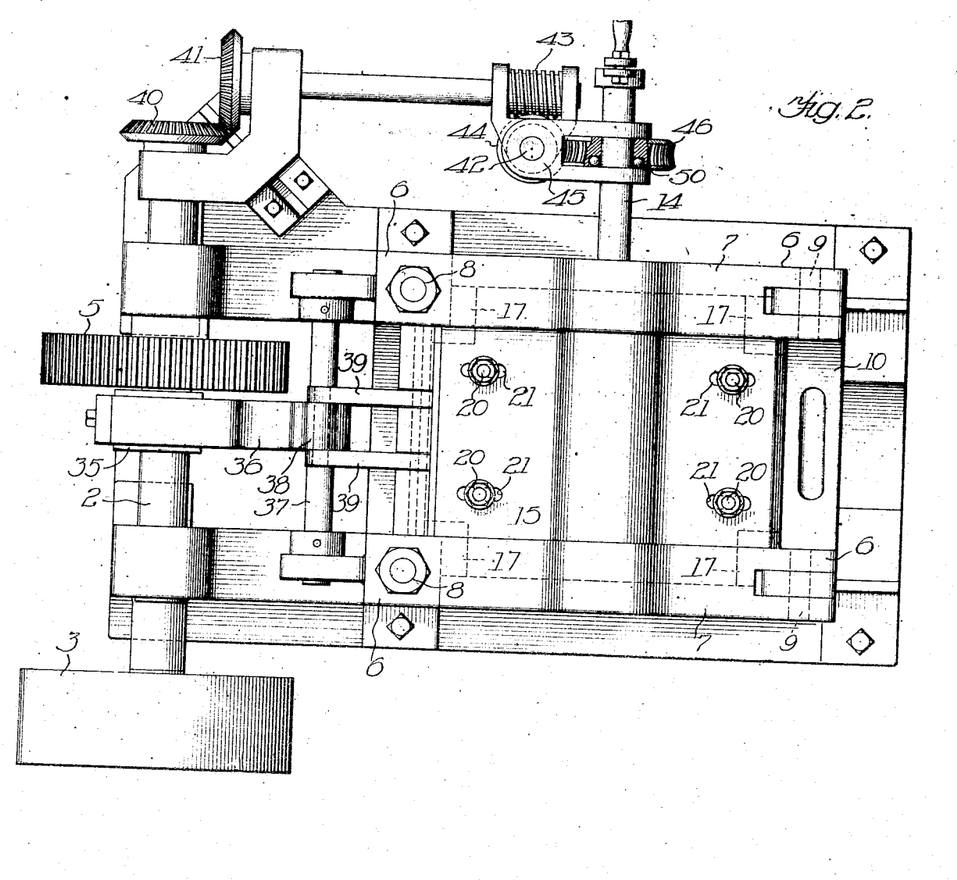
—Fig. 2 is a top view.

Inasmuch as the cross-head 16 is permitted to slide vertically only, in the preferred construction, it must necessarily have a sliding connection with the eccentric cap 15, whose eccentric motion has a horizontal component with reference to said cross-head. In the preferred construction, this connection is secured by bolts 20, secured in the cross-head 16, which bolts slide in elongated slots 21 in the eccentric cap 15, as shown clearly in Figs. 2 and 4.

Figures 3, 9:
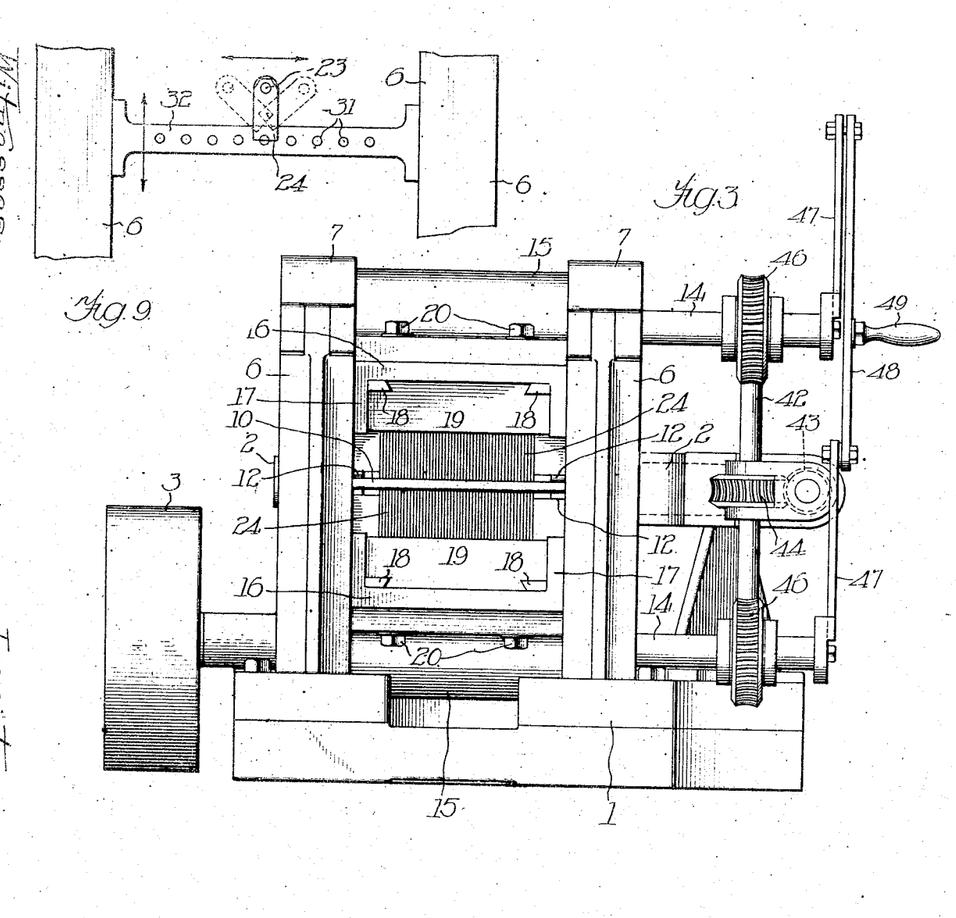
—Fig. 3 is an end elevation.
Fig. 9 is a detail of a former blade and spacer.

Depending from the upper slide 19, are links 22, which support the bolts or mandrels 23, upon each of which bolts are clamped the laminated formers consisting of alternate thin blades 24 and washers 25. The blades and washers are held in place by bolts 23ª. These blades consist preferably of pieces of steel or other suitable material, having in the preferred form, the general outline shown in Figs. 5 and 12, in which the beveled working edge 26 is at right angles with the length of the blade. This blade is adapted to rock against the surface of the lead blank through a small arc, as shown greatly exaggerated in Fig. 9. In this figure it will be seen that the blade rocks about an axis or pivot near its working edge, and if during this rocking, the blade is forced nearer the center of the blank, a convex depression will result, as shown more clearly in Figs. 12 and 16. The specific mechanism for accomplishing this motion is described later.

Figures 1, 8:
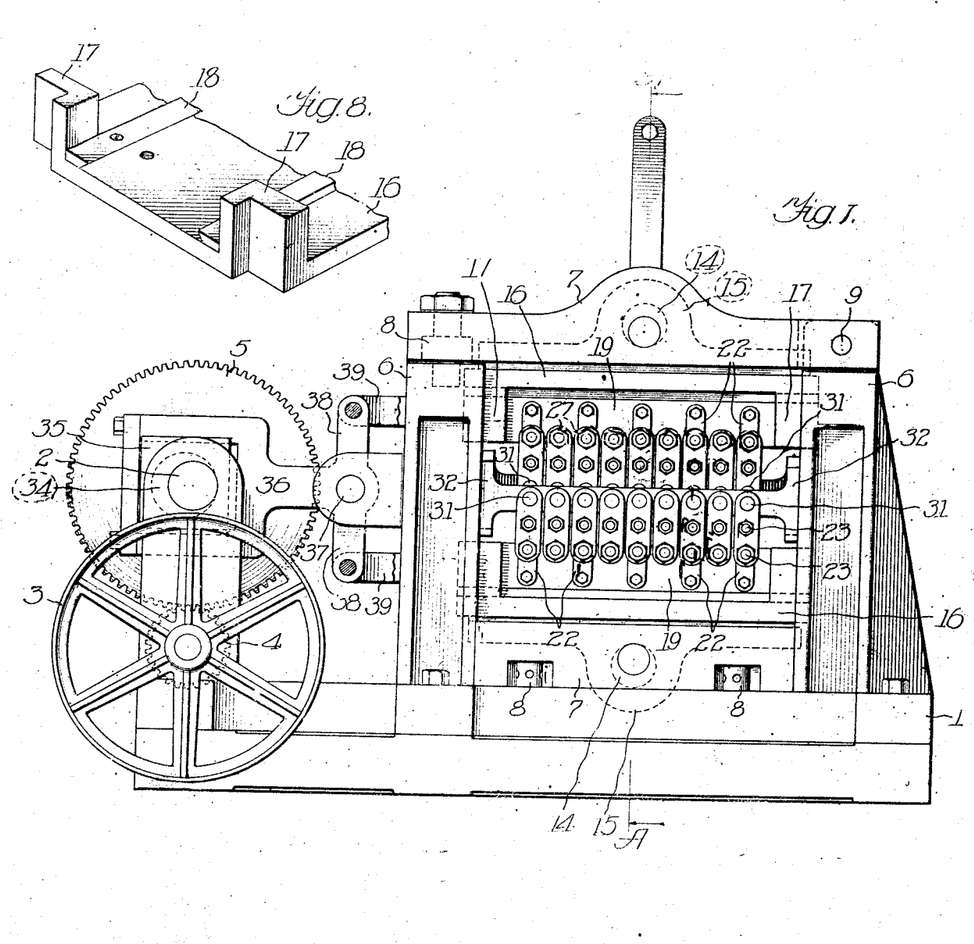
Figure 1 is a side elevation of the machine.
—Fig. 8 is a perspective of part of a plate or cross-head which slides in vertical ways and has dove-tailed sliding connections with a reciprocating bearing block.
Figure 4:
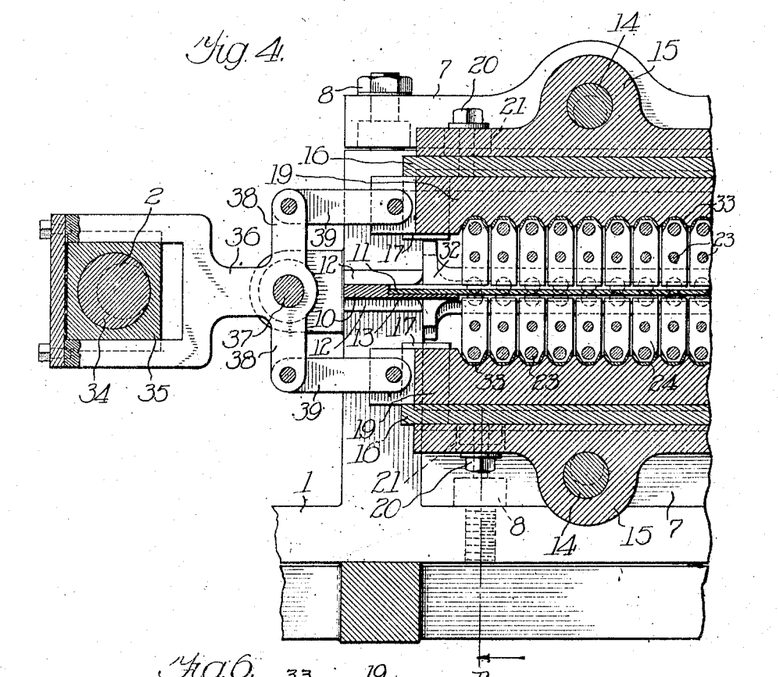
—Fig. 4 is a partial longitudinal section.
Figure 10:
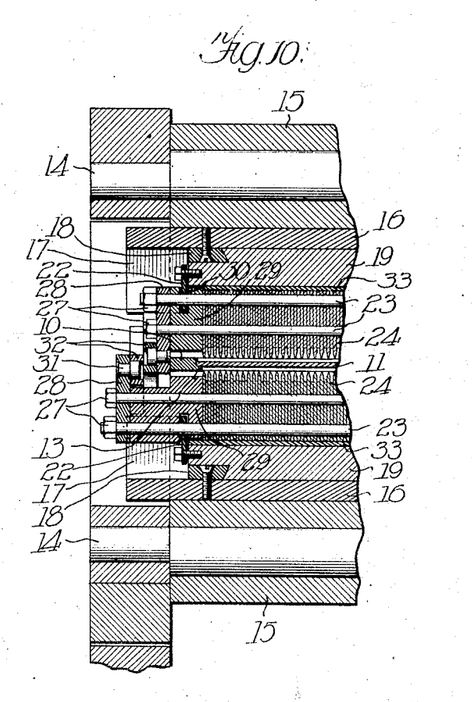
Fig. 10 is a partial section on line A—A, Fig. 1.
Figure 11:
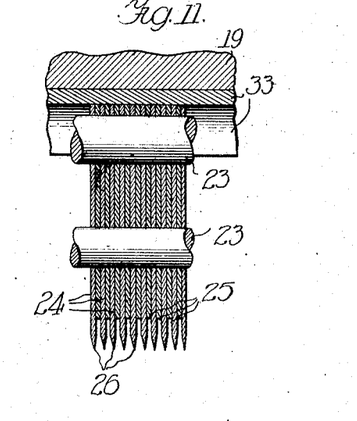
Fig. 11 is an enlarged section on the center line of one of the formers.
Figure 13:
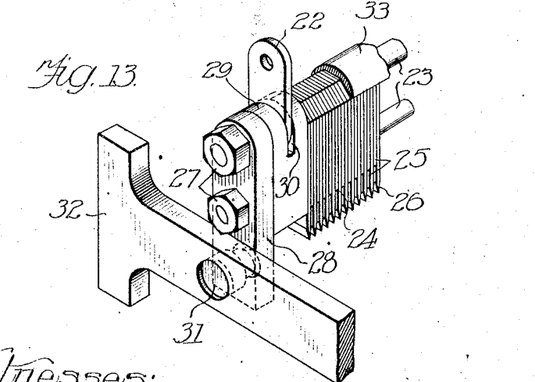
Fig. 13 is a perspective view of certain details.

As will be seen from Figs. 1 and 4, each side of the plate is worked on by a series of formers, the exact number depending on the size of the plate and other considerations. In the drawings, nine formers are shown by way of illustration. Each former is built up as shown in Figs. 10 and 11, by clamping the alternate separators 25 and blades 24 between nuts 27 on each end of the bolts, with two end plates or members 28 and 29 interposed between the nuts and the blades. The inner end plate 29, on each end of any one former, has a recess 30 to accommodate the link 22, as in Figs. 10 and 13. The outside end plate 28 extends beyond the inside plate 29 and is provided with a hole in which a stud 31 is located, said stud engaging in a hole in the spacer 32. As will be seen from Fig. 9, this spacer has the general shape of a section of I-beam, the squared ends of which are adapted to slide vertically between the upright members 6—6, although I do not limit myself to this construction. This spacer has a number of holes corresponding to the number of formers used, and the studs 31 in each hole serve to maintain the working ends of the formers in fixed, spaced relation, while at the same time constituting a pivot about which the former oscillates.

Figures 5, 6, 7:
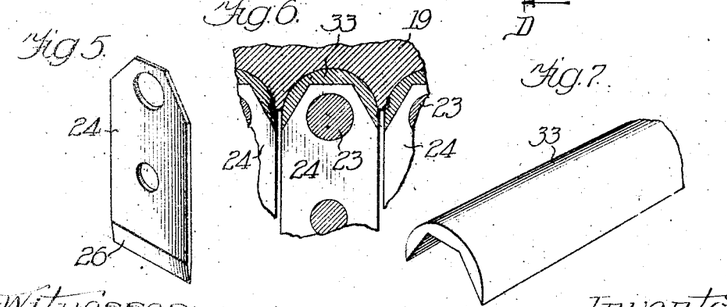
—Fig. 5 is a perspective view of one of the blades.
—Fig. 6 is a detail of a blade and its bearing.
—Fig. 7 is a perspective view of one of the oscillating bearings.

From an inspection of Fig. 10 it will be seen that there are two spacers 32—32, one for the upper set of formers, and one for the lower. These spacers are arranged closely together, which arrangement necessitates the use of a much thicker end plate 29 on the lower former than on the upper. In Fig. 6 is shown the arrangement by which the upper ends of the blades are adapted to rock with respect to the slide 19 which carries them and which imparts to their upper ends a reciprocating motion, causing them to also rock about an axis through the stud 31, shown in Figs. 10, 13 and elsewhere. The upper ends of the blades 24 fit into the under side of a rocking bearing 33, having a cylindrical surface bearing in a cylindrical groove in the slide 19. See Figs. 6 and 7. It is obvious that as long as the working edge of the blade 24 is forced against the blank, there will be a thrust against the slide 19, through bearing 33. When this thrust is removed, however, the bearing will fall from its groove in the slide 19, except for the detaining links 22. It is evident that two links, or even one link on a side would be sufficient to hold the entire group of formers in place by virtue of the connecting spacing member 32, pivoted to each former. In the drawings however, five links are shown.

From the above description it will be seen that if a slight reciprocating motion is given to the slide 19, the horizontal working edges of the formers will rock upon the surface of the blank. At the same time the spacers 32 will be given a slight vertical reciprocating motion, and this motion will occur whether the slide 19 remains at the same vertical height or whether it is being gradually lowered by its supporting cross-head 16, forced downward by the eccentric cap 15.

The shaft 2 carries the cam 34 working in a reciprocating block 35, which block gives a rocking motion to the member 36, pivoted at 37, and having oppositely extending arms 38. Links 39 connect the ends of these arms with the upper and lower reciprocating slides 19—19. It will be clear that the oscillating motion of member 36 will produce by means of links 39, simultaneous reciprocation in opposite directions of the slides 19—19.

In the above description, the action of the upper set of formers only has been described, but it will be obvious that the action of the lower set of formers which are arranged the reverse of the upper set so as to oppose their thrust, will be substantially identical. It should be noted, however, that the method of regulating the distance between the upper and lower eccentric shafts is not identical for each shaft. The upper shaft is adjusted by turning one regulating screw 8 to raise or lower one end of either upper bearing member 7, the other end being pivoted at 9. The lower shaft may be adjusted by a screw 8 at each end of the lower bearing member 7, although I do not limit myself to the above details.

Figures 14, 15, 16, 17, 18, 19, 20, 21:
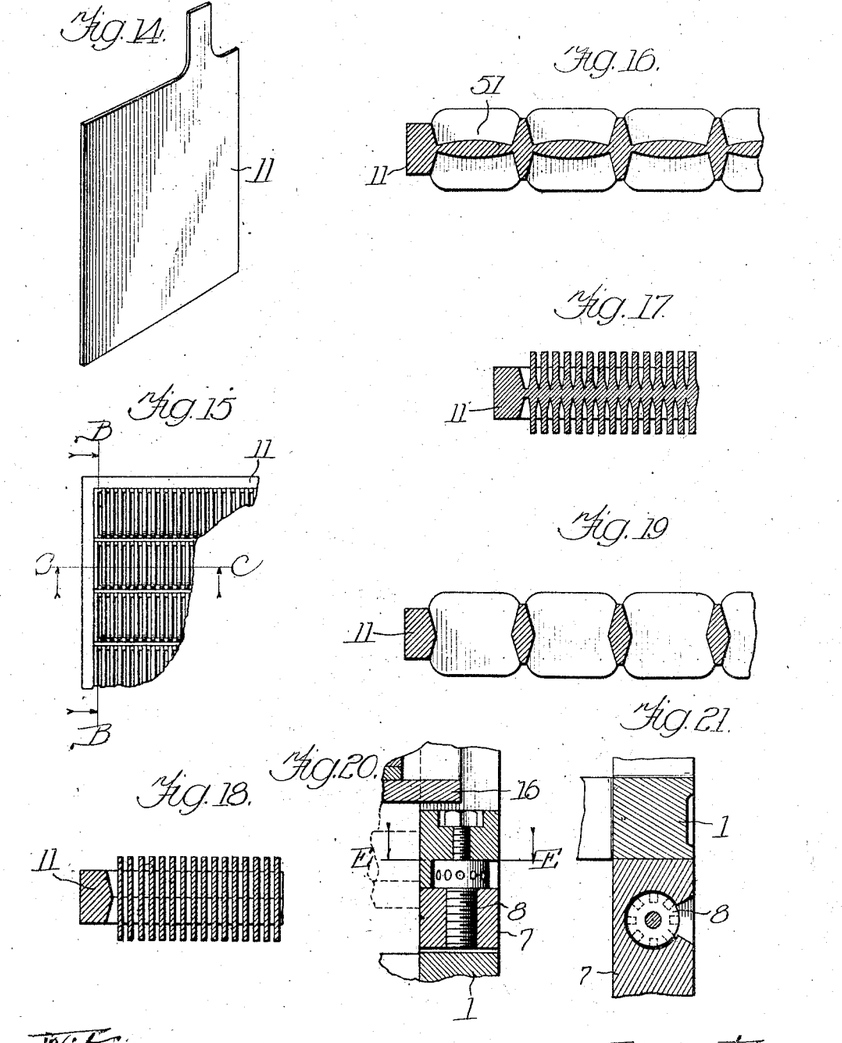

The adjusting screws may be of any suitable construction, the form shown in detail in Figs. 20 and 21 being a practical one. Each adjusting screw comprises an upper and a lower screw-threaded extension. The lower screw-threaded extension fits in the screw-threaded opening in the frame, while the upper screw-threaded extension fits loosely in the opening in the bearing block and is provided with a suitable nut. The screws are rotated by inserting a bar or wrench in the circumferential openings therein, whereby sufficient leverage is obtained to rotate the screws and raise or lower the bearing block.

The main shaft 2 carries a bevel gear 40, engaging gear 41 and driving the vertical shaft 42 through a worm and gear reduction 43, 44. This vertical shaft drives both eccentric shafts 14—14, by means of additional worm and gear mechanism 45, 46, so that the rotation of both eccentric shafts is very slow as compared with the main driving shaft. Any suitable means for advancing the formers either continuously or intermittenly, may be employed, however.

It is desirable to provide means for quickly retracting the formers after they have converted the blank into a finished plate, and for this purpose cranks 47—47 are fastened to each eccentric shaft and the ends of said cranks are connected by a link 48, provided with a handle 49. As seen particularly in Fig. 2, the gears 46 are connected to the eccentric shafts 14 through roller clutches 50. This construction permits the eccentric shafts to be driven in one direction from the main power shaft and also permits them to be turned ahead of the driving gears by means of the handle 49 to quickly withdraw the formers upon the completion of the plate.

Figure 12:
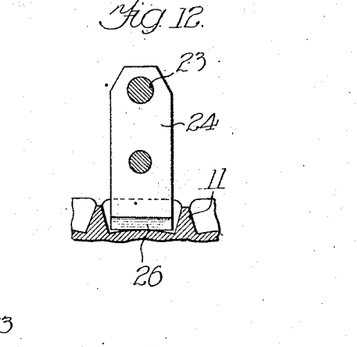
Fig. 12 shows an elevation of the preferred form of blade.

The working blade in the preferred form is of general rectangular outline as shown in Fig. 12. When a blade of this character is forced against and caused to rock upon a blank of lead or other material, the pressure on the blank is alternately applied and released on any small given area, and the corners of the blade work deeper into the metal than the middle portion, producing a recess with a convex inner end, as shown in Fig. 12 and at 51, Fig. 16. This is due to the fact that the radial distance from the axis of rotation 23 to the different points on the working edge, is not the same for all points. I do not limit myself to this feature, however, as the blades may assume a great variety of forms.

Although the angle of pressure of the blades against the blank undergoes some variation during the rocking of the preferred form of blade, the deviation of the line of pressure from the normal is never great enough to disrupt the metal by unduly crowding the outer stratum of the blank in a longitudinal direction. Furthermore, as the blank has a plurality of closely arranged blades embedded in it, the metal under any one blade cannot suffer much distortion in a longitudinal or lateral direction because of the restricting effect of similar closely adjacent areas which are being subjected to a similar pressure. Also the blades are not withdrawn during the rocking, but each remains in its individual groove, which thus becomes gradually deeper. As a result of all the above, there is practically no tendency of the plate as a whole, to spread in either direction, the displaced metal being worked up in the form of compact fins or ribs.

As seen in Fig. 5, the bevel at the end of the former is a very gradual one, and as seen further in Fig. 11, the washers do not extend far enough to meet the end of the bevel. This arrangement is not necessary, however, as a longer bevel might be used, extending to the lower end of the washers, or longer washers might be used, extending to the present bevel. The effect of the gradual bevel in either case is to compress the metal between adjacent blades by a wedging action, the fin or rib being worked upward still farther and having a squared end in one case and in the other case tapering gradually to the end. It will be understood, of course, that a former of integral structure may be used instead of one built up of laminations, the invention not being limited to any particular details of construction, as regards this feature, or any of the features of the machine selected for illustration only.

The operation of the machine is as follows: The blank holder having been withdrawn, a lead blank is placed therein and both members are then slid into the machine, with the formers and their supporting parts separated the maximum distance. Power is then applied to the main shaft and a reciprocating motion given to the slides as explained above. Simultaneously the associated parts and the eccentric caps begin to move toward each other gradually as in the preferred construction, due to direct connection between the shafts 14—14 and the driving shaft, thus embedding the blades in the blank. The effect of the reciprocation of the slides is to give a rocking motion to the working faces of the formers, so that the metal of the blank is gradually grooved, compressed and condensed under and between the individual blades as they advance, and worked up in the form of uniformly condensed fins between the blades, until the fins meet the washers, after which a still further compression may be secured by embedding the formers still farther in the metal. The kneading and pressing process is continued until the blades have been brought so close together that their working edges have almost forced their way through the lead blank, thus giving the desired cross section as shown in Fig. 16. It is understood that the so-called working edge is sharp enough to slowly force its way through the lead but does not cut or tear the metal, simply pushing it aside, and by compressing it between adjacent beveled blades, condenses it and renders its surface smooth, compact, and homogenous.

When it is desired to provide the plate shown in Fig. 19, the formers are brought even closer together until their ends practically meet, at which time the center web will have been entirely worked out, or reduced to a very thin membrane which is easily removed.

It has been found desirable to provide some sort of lubrication for the blades while they are being forced into the plate. For this purpose water is satisfactory and may be supplied to the plate in any convenient manner.

On completion of the plate, the formers may be quickly separated by hand power mechanism as described, by turning the eccentric shafts to separate the eccentric caps and parts carried thereby, whereupon the finished plate is removed from the frame and a new blank is substituted therefor.

It is obvious that many changes within the scope of the invention as defined in the appended claims, may be made in the machine described, and further, that the invention is not limited to the structure described above in detail, as said structure is selected for the purpose of illustration only, as constituting one of the many forms in which the invention may be embodied.

Having thus described my invention, what I claim and desire to secure by Letters Patent of the United States, is:

1. In combination, means for supporting a blank, means for simultaneously pressing small alined adjacent areas of said blank, said means including a plurality of blades, and means for imparting a slight rocking movement to said blades, whereby said blank is consolidated without material lengthening and the active edge of the former is not withdrawn from the blank.

2. In combination, means for holding a blank and formers applied to substantially the entire area of a side of said blank and means for manipulating said formers to simultaneously groove and condense said blank.

3. In a battery plate machine for operating on a metal blank, pivoted means for applying pressure to the blank, said means having a working edge straighter than the arc of the circle to which said edge is tangent and which has the pivot as a center.

4. A machine for working a blank to form a battery plate including formers and means for supporting a blank in operative relation to the formers, the formers being so constructed and pivoted that by a swinging movement in either direction they are caused to apply a gradually increasing pressure to the blank.

5. A battery plate machine having means for compressing a given area of a blank, said means including a pivoted means for pressing said area below the surface of the blank, said pivoted means being so shaped that by a swinging movement in either direction they are caused to apply a gradually increasing pressure to the blank, and means for manipulating said pivoted means to intermittently apply pressure to different portions of said area without withdrawing said pivoted means.

6. In a battery plate machine, a former for applying gradually increasing pressure to a blank, said former being provided with an operating edge adapted to be pressed into the blank, and means for rocking said former through an angle insufficient to withdraw same from the blank.

7. In a machine for working a blank, means for producing pressure on certain portions of the blank, said means being so constructed and pivoted that by a swinging movement in either direction they are caused to alternately apply a gradually increasing pressure on the blank and release said pressure without withdrawing the active portion of the pressure means from the blank.

8. In combination, means for supporting a blank, means for applying pressure to a plurality of points on said blank, and means for rocking said pressure means through an angle insufficient to withdraw the active face of said means from the blank.

9. In a battery machine, means for working a depression in a metal blank by constantly increasing pressure, and means for varying the angle of application of said means, whereby the superficial area of said blank is increased without materially spreading the plate.

10. A machine for forming storage battery plates comprising blades, means for forcing said blades into a blank, and means for simultaneously rocking said blades.

11. In a battery plate machine, blades pivoted near their working edges, means for forcing said blades into a blank, and means for rocking said blades about said pivots during their advance.

12. In a machine for forming a battery plate from a blank, in combination, means for supporting the blank, blades, and means for forcing the blades into the blank and imparting thereto a slight rocking motion as the same are forced into the blank, whereby depressions are formed having intermediate ribs of dense compact material.

13. In a battery machine, a plurality of closely grouped means for applying pressure to a blank and means for continually varying the angle of application of said means, whereby said means are embedded in said blank while the projected area of said blank remains substantially the same.

14. In combination, a plurality of closely grouped parallel means for applying pressure to a given area of a blank, and means for simultaneously varying the angle of application of each of said parallel means.

15. The combination with a battery plate machine, of means for supporting a blank, a pivoted former for working up the surface of said blank, said former being so constructed that by a swinging movement in either direction it is caused to apply a gradually increasing pressure to the blank, and means for manipulating said former to cause it to alternately apply a gradually increasing pressure and release the same and to make each successive application of pressure greater than the preceding application.

16. A blank holder for supporting a blank, and a former therefor having a working edge, means for advancing said former against said blank, and means for rocking said former during said advance, whereby said working edge is embedded in said blank.

17. In a battery plate machine, a blank holder, a former for grooving and pressing the blank, and provided with a straight working edge, means for reciprocating one of said elements with respect to the other, and means for embedding the former in said blank.

18. The combination with a blank holder, of a former pivotally supported adjacent thereto, said former having a working edge normally parallel to the blank, and in contact therewith, means for reciprocating one part with respect to the other, whereby a rocking motion is imparted to said former for alternately embedding the opposite ends of said working edge in said blank.

19. The combination of a blank holder and a former for rocking against the surface of a blank, a pivotal support for said former, said former having its operating portion arranged at different distances from the pivoted support, means for moving said support substantially parallel to said blank, whereby portions of said former at different distances from the axis of rotation, are embedded different amounts in said blank.

20. In combination, a frame for supporting a blank, a plurality of individual members arranged to cover a given portion of said blank, means for simultaneously pressing said members against said portion with a slight oscillating motion, whereby parts of said portion are subjected to pressure alternately increased and diminished.

21. In a machine for working a blank, in combination, a plurality of formers applied to small areas of said blank, means for advancing toward and embedding said formers in said blank with a rocking motion whereby the metal of the small areas is confined by adjacent formers and subjected to a kneading action.

22. The combination with means for supporting a blank in a frame, of a plurality of formers on opposite sides of said blank, means for simultaneously embedding said formers in opposite sides of said blank with a slight rocking motion whereby said blank is condensed and its configuration changed without materially lengthening said blank.

23. A battery plate machine having a group of formers consisting of a plurality of individual blades, means for forcing said blades into a blank with a slight rocking motion whereby the metal of the blank is compressed adjacent said blades and worked up between said blades without materially lengthening said plate.

24. In combination, a plurality of closely grouped formers, each comprising a plurality of parallel blades, the whole presenting a working face adapted to substantially cover a given area of a blank, means for advancing the working face toward a blank, and means for rocking the blades through a slight angle to embed the working faces of the formers in the blank, said angle being insufficient to cause withdrawal of any part of the working faces from the blank during the rocking thereof.

25. A battery plate machine having a former including a blade angularly movable about an axis and having a working edge normal to a radius of the arc through which said blade is movable.

26. A battery plate machine having a former including a member angularly movable about an axis, said member tapering at one end to a straight, narrow, working edge.

27. A former for working grooves in metal comprising a pivotally mounted blade having a working edge, portions of which are at different distances from the pivotal point.

28. In combination, a former having a working edge for operating on a blank, a pivotal support adjacent said edge of said former, and means for reciprocating the end of said former remote from said blank, whereby the opposite end of said former is caused to manipulate and work the surface of said blank.

29. A built up former comprising a plurality of plates having interposed separators, the whole being clamped into a unitary structure, and having a supporting axis, said plates having working edges extending beyond said separators, the extremities of said edges being a greater distance from said axis than the intermediate portions of said edges.

30. A former consisting of blades mounted on a mandrel and secured by end plates, said mandrel constituting a pivot, a supporting block for said former, having a bearing groove, a sectional bearing in said groove, between said block and said blades for taking up the thrust of said blades and links secured to said block and mandrel to maintain the proper relation of the parts.

31. A former consisting of a plurality of blades mounted on an arbor, said arbor constituting a pivotal support, and pieces on said arbor, between which said blades are clamped, a second pivotal support for said former engaging said end pieces in line with the working edges of said blades, means for reciprocating said arbor in a line at right angles to said blades, whereby a rocking motion is imparted to the working edges of said formers.

32. A bearing block for a former, having a groove of circular section, a semi-cylindrical bearing adapted to fit said groove and rock therein, said bearing having a depression and a former having a portion shaped to fit said depression.

33. In a machine having parallel ways, the combination with a member adapted to slide in said ways, of two blocks slidably secured thereto, one block having an eccentric motion, one component of which causes said member to slide in said ways, carrying with it the other block, means for moving said other block with respect to said member independently of the sliding of said member in the ways.

34. A housing having parallel members, a locater adapted to reciprocate between said parallel members, a plurality of formers each pivotally secured to said locater and spaced thereby, a support mounted on said housing and adapted to reciprocate at right angles to the motion of said locater, a second pivotal connection between each former and said support, means for reciprocating said support whereby a rocking motion is given to said formers about the first pivotal connection as an axis, and whereby a reciprocating motion is communicated to said locater by said formers.

35. A machine comprising a bed-plate and perpendicular members constituting ways, a cap mounted on said members and adjustable with respect thereto, said cap serving also as a bearing for an eccentric shaft, means mounted on said bed-plates and adjustable with respect thereto, said means serving as a bearing for a second eccentric shaft, an eccentric block mounted on each shaft, plates adapted to slide in said ways and slidably secured to said blocks, a reciprocating member secured to each plate and adapted to slide thereon, a plurality of formers pivotally secured to each member and constituting groups having opposed working surfaces, an oscillating member pivoted to certain of said perpendicular members, means for oscillating said member, and connections between said oscillating member and said reciprocating members for simultaneously imparting motion to said members, said means also driving said eccentric shafts, whereby said eccentric blocks and associated parts are caused to approach and recede from each other.

In witness whereof, I have hereunto subscribed my name in the presence of two witnesses.

FRANK ENGEL.

Witnesses:
J. B. SAUTER,
HERTHA GLAWATZ.